FIG. 1

AREA REQUIREMENT

INVENTOR
CHARLES W. ROSS

BY William T. Miller Jr.
AGENT

United States Patent Office 3,454,749
Patented July 8, 1969

3,454,749
ERROR ADAPTIVE CONTROL SYSTEM
Charles W. Ross, Hatboro, Pa., assignor to Leeds & Northrup Company, a corporation of Pennsylvania
Filed Sept. 9, 1965, Ser. No. 486,125
Int. Cl. G06f 15/46
U.S. Cl. 235—151.1                                24 Claims

ABSTRACT OF THE DISCLOSURE

A load-frequency control system in which the area requirement controls the generation in each area of a power distribution system with the response of that control modified by being decreased for those area requirement values which are of polarity such that control action in response to them would not tend to decrease the deviation of the power interchange of the area from schedule or the accumulated time error.

---

This invention relates to an improvement in process control systems for effecting a modification of the action of the control system in response to a first measured variable in accordance with the magnitude of a second related variable of the process so as to reduce the deviation of the second variable without increasing the deviation of the first variable.

In some process control applications it is desirable not only to maintain a continuous control over a first variable which may, for example, be represented by a noisy signal but also it is desirable to maintain another or second and related variable derived from the first variable as close to its desired value as is possible under the particular conditions of the process being controlled. The derivation of the second variable may be other than by direct means, such as from measurements made by separate primary elements.

A typical process in which the present invention would be useful would be that of maintaining economic power distribution among a plurality of power sources in a power distribution network. In such a process the variable of primary importance is Area Requirement (Area Control Error), which characteristically presents a noisy signal. Since power distribution networks are usually connected by long tie-lines to other similar networks for the purpose of exchanging power therebetween and also for the purpose of assisting one another in the maintenance of a desired frequency, there is also the necessity for each network to maintain as closely as possible the desired or scheduled interchange of power between them at the set frequency. In additon, the networks each are generally required to put back into or accept from the system formed by the interconnected networks that energy which they received or provided to the other networks which was not scheduled to be interchanged and also to put back into or accept from their own network that energy which will correct for the time error which has accumulated due to frequency changes resulting from any previous failure to maintain sufficient power output to carry their own load.

Control is sometimes applied to processes which are themselves incapable of responding at a rate sufficient to make possible an effective reduction of certain types of deviations, such as transient deviations of short duration, these transient deviations are generally characterized as noise signals. They may be of random nature with frequent changes in polarity of they may be somewhat regular periodic responses to a particular, but known, disturbance in the process under control. On the other hand, they may be of known character but nevertheless random in occurrence.

When the process is such that random noise signals are encountered it is sometimes desirable to have the control respond to these signals with a reduced gain if they are not amenable to being corrected with sufficient rapidity to take advantage of the controller gain which is needed for correcting the larger or long term deviations of the process variable under control.

A method and means for controlling processes in which the variable can be characterized as a noisy signal is disclosed and claimed in U.S. patent application Ser. No. 399,216 which was filed by the present inventor on Sept. 25, 1964. That method and means is useful with the present invention as will be described.

It is therefore an object of this invention to provide an improved method and means for process control.

Another object of this invention is the provision of a method and means for modifying the response of a control system to the deviation of a first variable from its desired value so as to cause a correction of the deviation of another related variable from its desired value without increasing the deviation of the first variable.

A further object of this invention is the provision of means for preventing unnecessary control action in response to a noisy error signal while also modifying the response to that signal so as to reduce a second variable toward its desired value.

A still further object of this invention is the provision of a method and means for varying the values which deviation or error signals must exceed before modifying the response of a control system responsive to one variable with the variation being in response to another related variable of the process under control.

A further object of this invention is the provision of means for filtering noisy error signals to prevent excessive and unnecesary control action with provision for the modification of the filtering to allow a portion of the noisy signal to assist in the correction of another related but different error signal of the system without at the same time increasing the magnitude of the noisy error signal.

In carrying out this invention in a process control system responsive to deviations of a first variable of a process from its desired value there is provided the combination of a means for independently determining the deviation of the value of a second variable of the process which is related to the first variable as well as a means which is outside of the loop formed by the control system responsive to the first variable and which is operable in response to the deviations of the second variable from its desired value for varying the response of the loop to the deviations of the first variable so as to provide control action to the process tending to bring the second variable to its desired value with control actions which will not tend to increase the existing deviations of the first variable from its desired value.

For a more detailed understanding of the invention reference is made to the following drawings in which like reference characters identify like elements.

Figure 1:
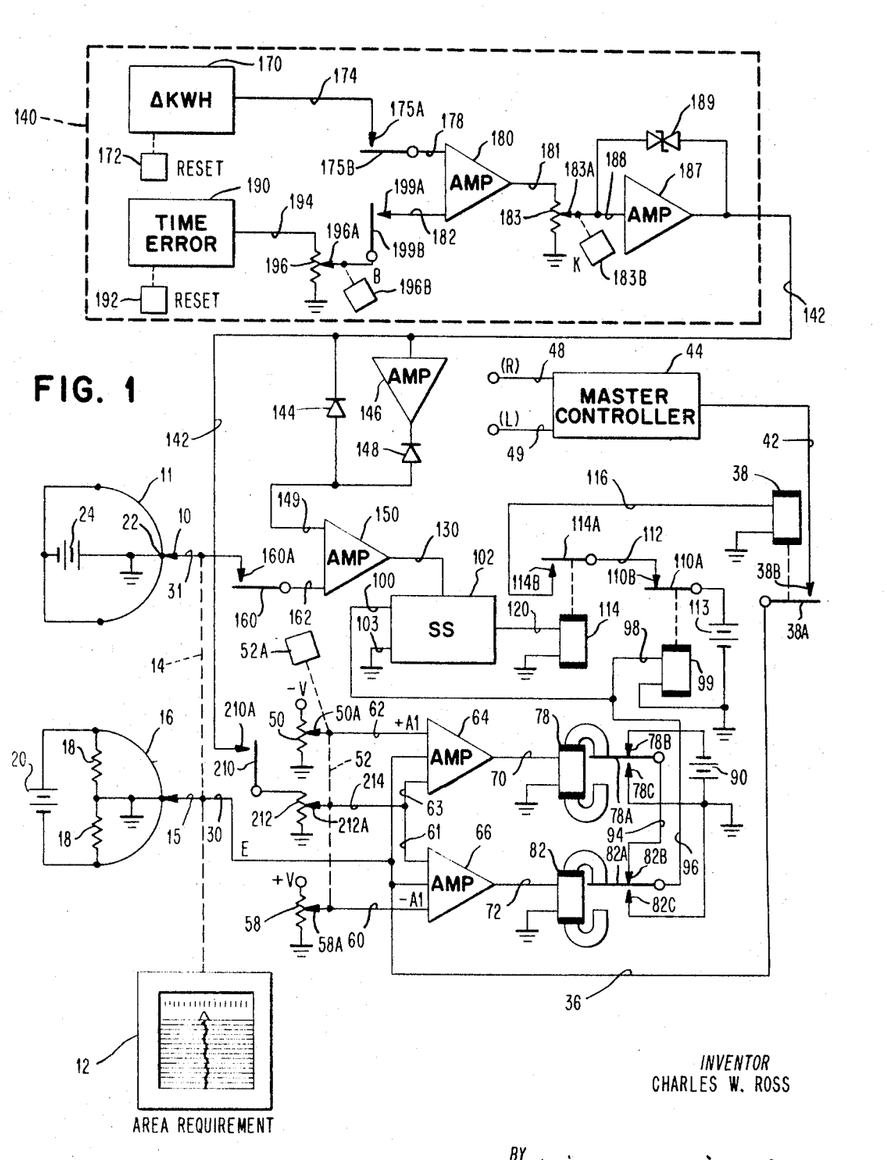
FIG. 1 is a circuit diagram partially in block form showing one form of the novel control circuit as it is applied to load frequency control in a power distribution network.

In FIG. 1, which shows one form of the novel control circuit as it might be applied to the economic control of a power distribution network, the first or primary variable upon which the control of the network is based is Area Requirement, sometimes referred to as Area Control Error. This variable is computed and recorded on recorder 12. This computation may utilize circuits such as those disclosed in U.S. Patent 2,688,728 issued to J. B. Carolus on Sept. 7, 1954. From the Carolus patent it will be evident that the Area Requirement of a network is equal to the deviation of the power interchanged between that network and its neighboring interconnected networks from the scheduled interchange plus the deviation of the frequency of the system from its set value multiplied by the frequency bias of the network to be controlled. This frequency bias is indicative of the frequency characteristic of the network itself.

The Area Requirement recorder 12 in FIG. 1 may be considered as including slidewire 11 and its associated contact 10 as well as slidewire 16 and its associated contact 15. The contacts 10 and 15 are both shown as being positioned on their respective slidewires 11 and 16 by the mechanical coupling 14 between those contacts and the recorder 12.

Slidewire 16 is shown as being shunted by resistors 18 which are joined at a center point to a ground connection. Slidewire 16 is also shunted by a power supply, such as the D.C. source represented by battery 20. Movement of the contact 15 over the slidewire 16 by mechanical coupling 14 therefore can cause the potential on line 30 to be either positive or negative in polarity depending upon the direction of travel of contact 15. The signal provided on line 30 represents an error signal or a deviation from set-point or desired value for the Area Requirements. Normally the desired value for Area Requirement is zero. Where the set-point or desired value is not zero it is, of course, possible to introduce the set-point value by varying the rotational position of slidewires 16 and 11 by mechanical means, not shown.

In FIG. 1, the slidewire 11 is shown as having its center point 22 connected to a ground connection and to the positive side of a D.C. source consisting of battery 24, the negative side of which is coupled to both sides of slidewire 11.

The output on line 31 from contact 10 is representative of the Area Requirement or Area Control Error as is the signal on line 30 except that the potential at line 31 will always be of negative polarity regardless of the side of center point 22 to which contact 10 is positioned. Thus, the potential on line 31 is a potential which is always of a negative polarity and of magnitude representing the deviation of the Area Control Error or Area Requirement from its desired value.

The control of the generation in the distribution network to which the present control is to be applied is normally carried out by a signal E, representing Area Requirement, being supplied from line 30 to line 36 through switch contact 38A and switch contact 38B and then by way of line 42 to master controller 44. The master controller 44 then produces either "raise" impulses on output line 48 or "lower" impulses on output line 49 in dependence upon the polarity of the signal on line 42. These "raise" impulses R or lower impulses L are then sent to the governor motor of the generators which are being utilized to control the power generated in the network. The manner in which these pulses can be filtered and sent to the respective generator to establish an economic distribution of the load of the network is described in more detail in many publications such as "Handbook of Automation, Computation and Control," vol. 3, by Grabbe, Ramo and Wooldridge, published in 1961 by John Wiley & Sons, Inc. It will thus be evident that the recorder 12, which established the potential on line 30, and the connecting line 36, the contacts 38A and 38B, line 42, master controller 44 and the associated control circuitry which responds to the "raise" or "lower" impulses from lines 48 and 44, all taken together, form a control loop which is effective to tend to reduce the deviation of the first variable, Area Requirement, from its existing value toward its desired value of zero.

There is, however, in FIG. 1 a means provided outside of this loop which is effective to operate relay 38. As will now be explained, the energization and deenergization of relay 38 is under the control of both the Area Requirement signal on line 30 as well as the other related variable. Since it is important that the value of Area Requirement be normally maintained close to zero, whenever there is a significant deviation from zero of that value, the circuitry shown in FIG. 1 outside of the loop must necessarily energize relay 38 so as to complete the loop and provide the necessary control action in the network to reduce Area Requirement whenever Area Requirement is of such a value that its correction becomes a mandatory factor in the control of the network.

On the other hand under certain conditions the relay 38 may be energized to allow for control action to occur even though the Area Requirement is not of a sufficiently high value to require control action. Such a condition may, for example, be the situation which exists when unscheduled tie-line interchange has occurred or when time-error has been accumulated and the polarity of the Area Requirement is such that correction of those quantities can be accomplished with a minimum of control action. Under such conditions control action would be allowed to occur by virtue of the energization of relay 38; but under other conditions, that is where there is no unscheduled interchange or time-error, control might normally be prevented or at least altered in order that there would not be an excessive controlling action in the network.

In FIG. 1 potentiometer 50 is supplied by a potential —V at one end and is connected at its other end to a ground connection so that its contact 50A will be at a negative potential as determined by its position as established by the movement of the mechanical coupling 52 by the adjusting knob 52A.

Mechanical coupling 52 is also connected to vary the position of contact 58A on potentiometer 58 which is supplied by a voltage +V at one end and is connected at its other end to a ground connection. Contact 58A provides a potential, which is always positive, on line 60 whereas, as pointed out previously, contact 50A always supplies a negative potential on line 62.

As shown in FIG. 1, line 30 is connected to high gain amplifiers 64 and 66 where the potential E is compared with the respective signals provided on lines 62 and 60 as effectively modified by the potentials on lines 63 and 61. The potentials on lines 62 and 60 represent, respectively, the negative and positive limit values of the magnitude of the Area Requirement signal E which is required to produce outputs on lines 70 and 72 from amplifiers 64 and 66, assuming the potentials of lines 63 and 61 to be zero. Thus, if the signal E is positive and exceeds the potential on line 62, an output signal appears on line 70 to energize the polarized relay 78 and thereby cause relay contact 78A to disconnect from its upper stationary contact 78B and connect to the lower stationary contact 78C.

Similarly, if the signal E is more negative than the potential on line 60, high gain amplifier 66 produces an output on line 72 which energizes polarized relay 82 to cause the movable contact 82A of relay 82 to disconnect from the upper stationary contact 82B and connect with the lower stationary contact 82C.

The effective limits established by the potentials on lines 62 and 60 can be modified by the potentials on lines 63 and 61 as will later be explained.

As shown in FIG. 1, the battery 90 has its negative terminal connected to upper stationary contact 78B and its positive terminal connected to both the lower stationary contacts 78C and the lower stationary contact 82C as well as to a ground connection. The upper contact 82B of relay 82 connects by way of line 94 to the movable contact 78A of relay 78. If the relays 78 and 82 deenergize, as shown in FIG. 1, the movable contacts of the relays are in contact with their upper stationary contacts so as to complete a circuit between the negative side of battery 90 to line 96 which is connected by way of line 98 to relay coil 99 and which is also connected by way of line 100 to single-shot timer 102, as an input thereto. Single-shot timer 102 also has a ground connection by way of line 103.

Whenever either relay 78 or 82 is energized to move its movable contact from contact with its upper stationary contact to contact with the lower stationary contact the grounded posiive terminal of battery 90 is then connected to line 96 and through line 98 to the relay coil 99. It will thus be evident that as long as relays 78 and 82 are deenergized relay 99 is energized to maintain contact 110A out of contact with its upper stationary contact 110B whereas whenever any one of the relays 78 or 82 is energized relay 99 is deenergized and contact is maintained between the movable contact 110A and the stationary contact 110B. When such contact is maintained then current is supplied from the battery 113, which has its negative terminal grounded, through the movable contact 110A to stationary contact 110B. Stationary contact 110B is connected to wire 112, which in turn connects to the movable contact 114A of relay 114 so that when relay 114 is energized current can flow to the lower stationary contact 114B and thence through line 116 to relay coil 38 for energization of relay 38.

Relay 114 is energized only during the period when the single-shot timer 102 is producing an output pulse on its output line 120. This occurs only after a predetermined period of time following an input signal on line 100 to the input of the single-shot timer 102. That predetermined period is adjustable, as will be later explained, by the signal which appears on line 130.

It will be evident, in view of the above description, that upon the energization of either relay 78 or 82 as a result of the Area Requirement variable deviating from its desired value of zero by a magnitude greater than one of the limit values established by the adjustment of knob 52A on the lines 60 and 62, there is produced an input pulse to single-shot timer 102 and relay 99 is maintained in a deenergized state, all assuming a zero potential on lines 63 and 61. Then when single-shot timer 102 times out and produces an output pulse on line 120 to energize relay 114, current will flow from battery 112 to relay 38 to energize that relay and connect the contacts 38A and 38B to allow control by virtue of the actions of the master controller 44 in response to the Area Requirement signal E.

No such control will be affected whenever the signal E is within the positive and negative limits as set up on lines 60 and 62 by the adjustment of knob 52A, when the potentials on lines 61 and 63 are zero, for under such conditions the Area Requirement magnitude is not sufficiently great to warrant control excursions of the governor motors which affect control of the generation of the generators. If the excursions of Area Requirement are beyond the values set up as limits on lines 60 and 62 they must then also exceed those limits for a time period equal to that set for the single-shot timer 102 by the signal on line 130 before control is allowed to be affected by the energization of relay 38. Thus, the control of the system is a joint function of both the magnitude of the error signal or deviation E and of the duration of the period during which that error signal exceeds any one of the preset limits as established by adjustment of knob 52A.

It will also be evident that the affect of the limit settings established by the knob 52A and the time period set by the signal on line 130 is to filter out a portion of the short duration and low level deviations which have been referred to as noise so that they do not affect the control of the network.

Under some circumstances it is desirable to reduce the magnitude limits or the time limits or both in order to utilize the noise signals to effect the return of another related variable of the system to a preset value. To effect such a modification of the time limit in FIG. 1 the circuit shown in block 140 is introduced to modify the timing of single-shot timer 102 by virtue of the fact that the output signal from block 140 on line 142 is supplied either by way of diode 144 or by way of amplifier 146 and diode 148 to the input line 149 of amplifier 150 so as to produce a signal on line 130 which has a variable potential of one polarity the potential being related to the second variable subject to control by the present system. For the present considerations it may be assumed that the contact 160 is disconnected from the stationary contact 160A so that the potential on line 10 is not connected as an input to amplifier 150 by way of line 162. Under such conditions the signal on line 142 is the only signal which is then affecting the setting of the time period for single-shot timer 102.

The circuit of block 140 includes a kilowatt-hour meter 170 which has a reset knob 172 and which provides on its output line 174 a signal indicative of the deviation of the interchange of the network being controlled from the set interchange desired for that network with the neighboring interconnected networks. The signal on line 174 indicative of this deviation is supplied through normally closed contacts 175A, 175B to line 178 which is an input to amplifier 180.

The other input to amplifier 180 is by way of line 182 and is derived from a time-error measurement made by the time-error meter 190. Meter 190 has a reset knob 192 and an output line 194 connected to one end of potentiometer 196, whose other end is connected to ground. The variable tab 196A of potentiometer 196 is adjusted by knob 196B so that its position corresponds with the frequency characteristic B of the network being controlled. There is therefore produced on line 198 a signal representative of the product of time-error and B, the frequency bias. The signal on line 198 is then introduced to amplifier 180 by line 182 after going through the normally closed contacts 199A, 199B.

Amplifier 180 provides an output on line 181 to potentiometer 183 whose variable contact 183A is positioned by knob 183B so as to introduce a constant $k$ which is a weighting value. Contact 183A is connected to amplifier 187 by way of line 188 in order to change the sign of the signal on line 188 so that it will be reversed on line 142. Amplifier 187 is shunted by Zener diode 189 which limits the signal which may be produced on the output line 142 of block 140. Thus, while the signal on line 188 may continue to change beyond the limit value established by Zener diode 189, the signal on line 142 will be limited, and the timing of the single-shot timer 102 will be limited as to its range of adjustment by the consequent limiting of the signal appearing on line 130.

If it is desired, the timing of the single-shot timer 102 may be varied not only in accordance with the signal on line 142 but also in accordance with the magnitude of the Area Requirement E by the closing of the contacts 160 and 160A so as to introduce the potential on line 31 to amplifier 150 by way of input line 162. Then the timing of the single-shot timer 102 will be a function of both the Area Requirement and the combination of the time-error and the accumulated unscheduled interchange of the network with other networks from the desired values.

The polarities of the signals on lines 174 and 194 are arranged to be such that the signals on lines 178 and 182 will tend to cancel to the extent that they result from a load change in another area or network. Thus, if the flow of unscheduled power into the network gives a positive signal on line 178 indicative of the energy received an increase in frequency produces a negative signal on line 182 in accordance with the resulting time-error accumulated. The signals on lines 178 and 182 are added algebraically and after being weighted by potentiometer 183 and limited by diode 189 the result is the second variable. If desired one of the switches 175A, 175B or 199A, 199B may be opened to limit the second variable to either KWH or time-error rather than a joint function of both.

As will be evident the second variable which appears on line 142 can be introduced into the circuit in such a way that the limit values for the amplitude of the deviation of the first variable, Area Requirement, is effectively varied in accordance with the magnitude of the deviation of the second variable.

This can be accomplished by closing switch contact 210 on contact 210A to connect line 142 to one end of potentiometer 212 which has a contact 212A positioned by mechanical coupling 52. Contact 212A by virtue of its connection to lines 61 and 63 thus provides a means for modifying the effective limits established by the potentials on lines 62 and 60, the modification being in accordance with the deviation of the second variable. Thus with the circuit as shown in FIG. 1, assuming contacts 210 and 210A closed, the deviation of the second variable can be utilized to change not only the duration of the time period during which the first variable has to exceed its magnitude limit before control action is taken, but also the magnitude of the limit itself as explained in connection with FIG. 2. With 210 and 210A disconnected only the duration of the time period is subject to variation.

Figure 2:
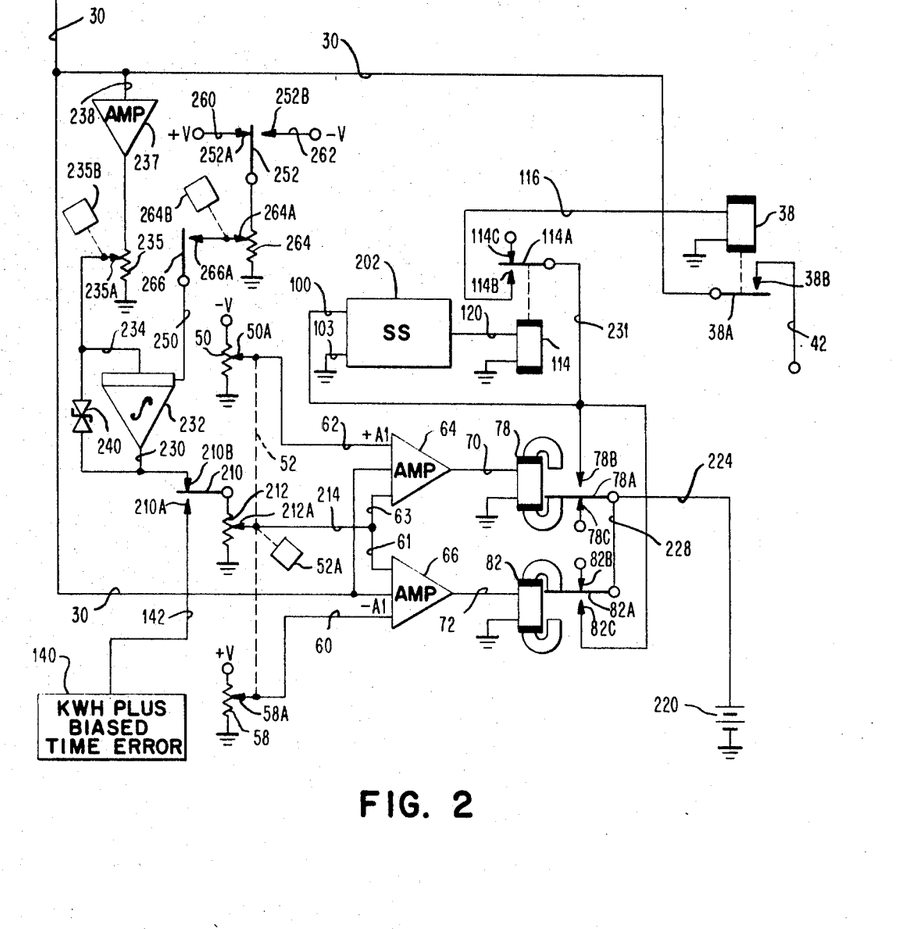
FIG. 2 is a circuit diagram of another form of the novel control circuit.

Referring to FIG. 2, if we assume as above that movable contact switch 210 is made with the lower stationary contact 210A, the line 142 is then connected to the upper terminal of potentiometer 212 whose contact 212A is positioned by the mechanical coupling 52 which as in FIG. 1 is adjusted by knob 52A. Since the signal on line 142 is limited to a value which will not exceed V in either polarity then the signal supplied on line 214 from contact 212A is adjustable with the adjustments of the limits $+A1$ and $-A1$. The line 214 provides an additional input to both amplifiers 64 and 66 as shown in FIG. 1. The polarity of the signal on line 214 should be such that when the signal on line 142 represents that the network has produced energy in excess of that scheduled for the network under control (unscheduled flow of power out of the network), the band between the $+A1$ and $-A1$ limits, which is the band in which no control action is taken, would in essence be shifted so that the noisy Requirement signals E which are in a polarity to indicate a deficiency of generation in the network under control for the existing load would have to exceed the limit $+A1$ by the amount of the effective shift in the limits. This amount of shift would correspond to the potential on line 214. Upon E exceeding $+A1$ by an amount equal to the potential on line 214 the polarized relay 78 would be energized to cause contact 78A to make with contact 78B. Thus, the control becomes responsive to greater values of E representing a deficiency of generation and to smaller values of E indicating excessive generation in the network before control will be affected.

It will be noted that in FIG. 2 the circuits connecting the contacts of relays 78 and 82 differ from those shown in FIG. 1. In FIG. 2 a battery 220 which has its negative pole connected to a ground connection and its positive pole connected to line 224 connects directly to the movable contact 78A and through line 228 to movable contacts 82A. When either relay 78 or relay 82 is energized from the polarized position shown in FIG. 2, either the contact 78A or the contact 82A is moved to contact their respective contacts 78B or 82C so as to connect the battery 220 to line 231 and to movable contact 114A, to which line 231 is connected. The movable contact 114A is normally in contact with the contact 114C when relay 114 is deenergized.

The connection of battery 220 to line 231 on energization of relay 78 or 82 also connects battery 220 through line 100 to the input of the single-shot timer 202. The single-shot timer 202 serves to produce on line 120 a signal which will energize relay 114 and hold the movable contact 114A into contact with the lower contact 114B after a predetermined period has passed following the energization of relay 78 or 82. Once relay 114 is energized then the battery 220 is connected by way of line 224 through contact 78A or 82A to line 231, relay contacts 114A and 114B and line 116 to relay 38, which is then energized to pull the movable contact 38A into contact with stationary contact 38B and thereby connect the signal E from line 30 to line 42. Line 42 is connected to the master controller in a manner as shown in FIG. 1 and the signal E is derived, for example, from an Area Requirement instrument such as that shown as an Area Requirement recorder 12 in FIG. 1 with the signal E being derived from a slidewire such as slidewire 16 in FIG. 1.

The single-shot timer 202 is of similar construction to the single-shot timer 102 except that the input line which is needed in FIG. 1, namely line 130, for varying the duration of the time is not needed in the single-shot timer 202. It is therefore omitted. If desired the line 130 could be included and it could be supplied with a signal which might be adjustable as desired to set the time duration for the single shot timer 202.

If it is desired that the second variable should be introduced from the measurements which are used to compute the Area Requirement signal E itself rather than from more accurate measurements such as those used in block 140 to compute the signal for line 142, then the movable contact 210 may be connected to the upper stationary contact 210B which is connected by way of line 230 to the output of an integrator 232. The integrator 232 receives its input from line 34, the input being derived from a variable tap 235A of potentiometer 235. The potentiometer 235 has its lower terminal connected to a ground connection and its upper terminal is connected by way of inverting amplifier 237 and line 238 to line 30. Thus, by varying knob 235B the contact 235A is adjusted on potentiometer 235 to determine the rate of integration by the integrator 232. Then the signal on line 230 is a particular constant, as determined by the setting of knob 235B, times the integral of the first variable E. It should be noted that the magnitude of the output on line 230 from the integrator 232 is limited by Zener diode 240 which shunts the input and output lines of integrator 232 to prevent the signal which appears at contact 210B from exceeding magnitude of the voltage $\mp V$.

With the integrator 232 connected to respond to the first variable E, modification of control in response to the first variable is continuously executed. It is sometimes desirable that the output of the integrator on line 230 be corrected at periodic intervals in accordance with readings made on more precise instruments such as on accurate kilowatt-hour meters and time error meters of the type described in connection with FIG. 1. In order to provide such a resetting of the value on line 230 there is provided a reset line 250 which is connected to integrator 232. This reset line is periodically energized with a potential which will determine the output on line 230 at that particular time. The particular potential which is used to energize the line 250 is determined in accordance with readings which would be taken on the kilowatt-hour meter and the time-error meter at particular intervals. When such readings have been taken it is only necessary for the operator to properly position the movable contact 252 so that it contacts the contact 252A if a plus voltage is desired or 252B if a minus voltage is required. It will be noted that 52A is connected by way of line 260 to a potential source $+V$. Contact 252B is connected by way of line 262 to the potential source $-V$. When the movable contact 252 has been properly positioned there then appears at the upper end of potentiometer wire 264 a potential $+V$ or $-V$. A portion of this potential is tapped off by the variable tap 264A of potentiometer 264 in accordance with the adjustment of the knob 264B. The potential on contact 264 is then connected to line 250 upon the actuation of movable contact 266 into contact with contact 266A.

While the circuits of FIGS. 1 and 2 each show only one set of limits, namely +A1 and —A1, it will be obvious that a plurality of such sets could be used. When using a number of different limits the operation of the control could, for example, be such that the gain of the control is varied in a number of steps as the first variable exceeded each of the different limits. Such an arrangement is disclosed in my earlier filed U.S. Patent application Ser. No. 399,216, filed Sept. 25, 1964. It will also be evident that other control function may be subject to variation in steps as the different limits are exceeded similar to the manner in which the gain is modified.

Figure 3:
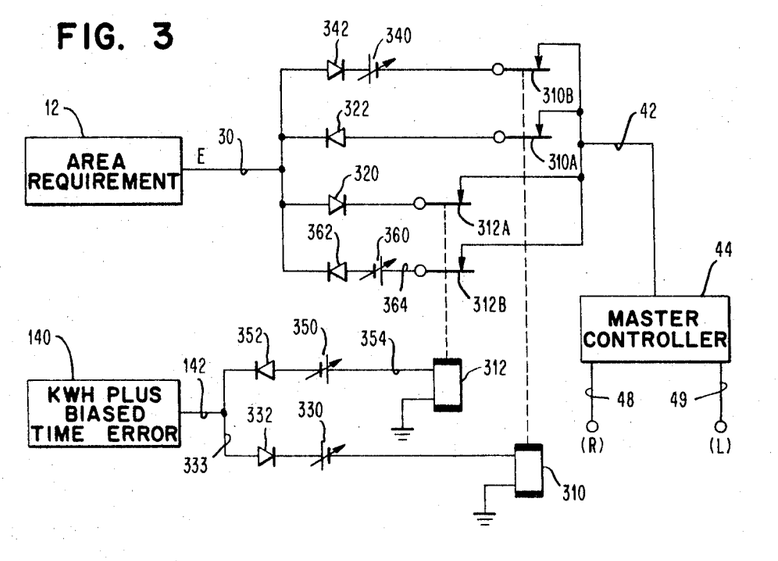
FIG. 3 is a circuit partially in block diagram form of still another variation of the novel control circuit.

In FIG. 3 the first variable, Area Requirement, represented by the symbol E and appearing on line 30, is connected by way of an intermediate circuit to line 42 so as to operate the master controller 44 to produce the desired "raise" (R) or "lower" (L) pulses on the lines 48 and 49, respectively, much as described in regard to FIGS. 1 and 2. In FIG. 3 all of the positive and negative excursions of the first variable on line 30 are normally effective to control the network in that they will appear on line 42 as inputs to master controller 44. Thus, in FIG. 3 the filtering nature of the intermediate circuit is omitted whereas in FIGS. 1 and 2 the particular characteristics of the signal on line 30 were utilized as a criteria for determining whether or not the signal would be allowed to go to the master controller 44 or not. Such filtering action is omitted from FIG. 4 at least whenever the second variable which appears as an output from block 140 on line 142 is at a zero value or below a predetermined value.

The output of block 140 on line 142 represents a requirement for correcting an accumulated difference between the energy actually supplied by the network under control and that which should have been supplied at a rate to maintain the scheduled tie-line interchange with the neighboring networks and also to maintain the desired frequency. Thus, when the network under control owes the system energy a positive signal appears on line 142 and when this signal is above a particular predetermined threshold, then the circuit interposed between line 30 and line 42 is effective to modify the response in the control loop of which lines 30 and 42 are a part. The manner in which this function is accomplished will now be described with particular reference to the elements of the circuit of FIG. 3.

When the signal on line 142 is zero or below a predetermined positive or negative value both the relay 310 and the relay 312 are deenergized and their respective contacts 310A and 310B as well as 312A and 312B are in contact with their associated stationary contacts, as shown. Under such conditions all of the signals appearing on line 30 representing a deviation of the first variable from its desired value are transmitted unchanged to line 42 and hence to master controller 44. The positive excursions of the signal on line 30 are transferred through diode 320 and through the closed switch contact 310B to line 42. On the other hand, the negative excursions of the deviations of the first variable which appear on line 30 are transmitted to line 42 by way of the diode 322 and the closed contact 312A.

When the signal on line 142 indicates that the network either owes energy to the system or is due to receive energy from the system to make up for an accumulated debit or credit with regard to its interconnected neighboring networks, then one of the relays 310 or 312 will be energized if the signal on line 142 is in excess of a predetermined threshold value. This predetermined threshold value is determined for the positive excursion of the signal on line 142 by the potential of the adjustable D.C. source 330 which back biases diode 332 in line 333. Thus, if the signal on line 142 is more positive than the potential of the variable D.C. source 330, diode 332 is forward biased and current is carried by line 333 to relay coil 310 to energize relay 310 and disconnect both movable contacts of the relay, namely, contacts 310A and 310B from their associated stationary contacts. It will be assumed that any necessary intermediate circuitry may be supplide by those skilled in the art as required to provide the power necessary to operate the relays from the signal provided by the second variable on line 142. With 310A and 310B disconnected a condition is present such that the negative excursions of the first variable E on line 30 will not be transmitted through the diode 322 to line 42. Instead, only the positive excursions which are transmitted by diode 320 and closed relay 312A will be transmitted to line 42. All of the positive excursions will therefore be effective to change the generation in the system by virtue of their effect on the master controller 44.

When, however, the signal on line 30 exceeds in a negative direction a particular preset limit value as established by the variable D.C. source 360 the diode 362 which is serially connected to source 360 in line 364 will conduct current through the closed contacts of relay 312B to line 42. The setting of the variable D.C. source 360 would normally be made in accordance with that magnitude of the first variable deviation which is sufficiently great to warrant an immediate control action regardless of the value which appears on line 142 from the deviation of the second variable as determined by the circuitry of block 140.

It will, therefore, be evident that the Area Requirement signal when in a positive polarity will be allowed to affect the generation in the network. However, negative polarity Area Requirement signals will not be recognized nor will they affect the generation of the system unless they exceed the preset value as established by the variable D.C. source 360. The Area Requirement signal E is therefore allowed to hang off in a negative direction without any control action being effected whenever the signal on line 142 is a positive value. Therefore, when there is an excess of generation in the network as represented by a negative excursion of the signal E, the network is allowed to put back into the system the energy which the network owes to the system, as indicated by the positive potential on line 142, except when the deviation becomes too great and control is necessary to maintain stability in the network. In that case the tendency to correct the second variable deviation is sacrificed to some extent by allowing that portion of the positive excursions E beyond the threshold established by source 340 to go to the master controller 44.

Similarly when the signal on line 142 is negative to an extent greater than that established by the variable D.C. source 350 the diode 352 is conductive and the relay 312 is energized by current flow in line 354. The energization of relay 312 causes a disconnection of the movable contacts 312A and 312B from their associated stationary contacts. Such an action effectively prevents the positive excursions of the Area Requirement, signal E, from being transmitted to line 42 and master controller 44. Instead only the negative excursions are transmitted as by way of diode 322 and the closed contact 310A. If, however, the signal on line 30 is sufficiently positive to exceed a preset potential as established by the variable D.C. source 340 then the diode 342 becomes conductive and the closed contact 310B allows a conduction of the portion of the signal on line 30 which exceeds the potential of source 340 to be transmitted to line 42 and hence to master controller 44 so that the necessary control action can be taken to correct for this excessive deviation of the Area Requirement in the network.

Figure 4:
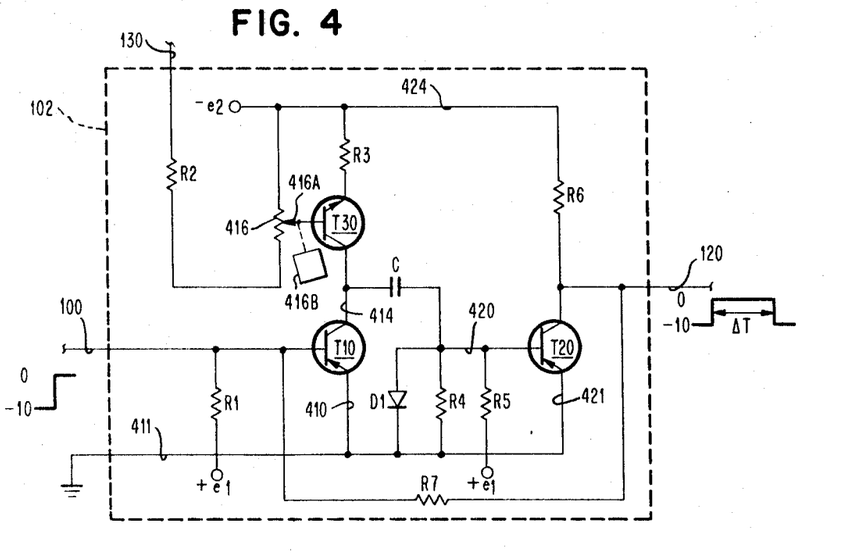
FIG. 4 is a circuit diagram of one form of the single-shot timer which is shown as a block in FIGURES 1 and 2.

The circuit of FIG. 4 illustrates one type of circuit which may be utilized for the single-shot timer 102 of FIG. 1. This circuit, of course, may take other forms depending upon the requirements of the external circuitry to which it is connected.

In FIG. 4 the input line 100 is coupled to the base of the transistor T10. The input signal introduced by way of line 100 is a positive going change of potential which may, for example, go from −10 volts to zero volts. When the input line 100 is at a −10 volt potential the PNP transistor T10 is in its normal "on" condition. Its emitter electrode is coupled by way of lines 410 and 411 to a ground connection while the collector electrode is coupled to be at a negative bias potential by virtue of its coupling through the transistor T30 as subsequently explained. The base electrode of transistor T10 is connected through resistor R1 to bias potential +e1 and its collector is connected by way of line 414 to the collector of the NPN transistor T30.

The emitter of transistor T30 is coupled by way of resistor R3 to a potential −e2 which provides a sufficient negative bias to cause transistor T30 to be "on" when its base is connected as shown to the movable contact 416A of potentiometer 416. Contact 416A may be adjusted by knob 416B so that the bias of the base connection of T30 is at an adjustable positive potential compared with its emitter. Potentiometer 416 and resistor R2 are connected serially between line 130 and the −e2 bias potential source.

The potential which automatically modifies the time duration of the single-shot timer of FIG. 1 is introduced on line 130 as a variable positive potential and it is effective to modify the potential established at the base of transistor T30 by altering the current through potentiometer 416. The current drawn by the transistor T30 is directly related to the potential of its base with respect to its other elements and therefore the current through transistor T30 is modified in accordance with not only the setting of the knob 416B but also directly in accordance with the signal introduced on line 130. By virtue of the fact that the transistor T30 is maintained in the "on" state the negative potential −e2 on the emitter is effective to establish a negative potential on the collector of transistor T30 and by virtue of the connection by way of line 414 the collector of transistor T10 is held at the same negative potential.

Shunted across transistor T10 is the series connected capacitor C and a parallel combination of resistor R4 and diode D1 with the diode being poled so that its cathode is connected to the ground connection 411 as is one side of the resistor R4. The other sides of resistor R4 and diode D1 are connected by way of line 420 to the base electrode of transistor T20. The base electrode is also connected through resistor R5 to a bias potential source +e1.

The emitter of transistor T20 is connected by line 421 to the ground connection 411 while the collector of transistor T20 is connected through resistor R6 to the negative potential source −e2 by way of line 424. The collector of transistor T20 is also connected through resistor R5 to a bias potential source +e1.

The emitter of transistor T20 is connected by line 421 to the ground connection 411 while the collector of transistor T20 is connected through resistor R6 to the negative potential source −e2 by way of line 424. The collector of transistor T20 is also connected to the output line 120 and by way of resistor R7 to the base electrode of transistor T10.

When transistor T10 is "on" as in its normal state prior to the introduction of an input signal on line 100, the collector of transistor T10 is effectively held at ground and the base of transistor T20 is slightly above ground by virtue of the current through R4 and R5 due to the +e1 source. Thus, the transistor T20 is normally in the "off" condition and the current flowing through transistor T10 also flows through transistor T30 and capacitor C is maintained in a discharged state. When the positive going input appears on line 100 the transistor T10 is turned off and the current drawn by the transistor T30 is drawn through capacitor C so that the base of transistor T20 is then coupled to have a negative potential sufficient to bias the transistor T20 to the "on" condition.

Upon turning off of transistor T10 and the turning on of transistor T20 the capacitor C begins to charge by the flow of current through R4. When the capacitor has become fully charged the required bias potential on the base of transistor T20 is no longer present and transistor T20 is then shut off and the output of line 120, which during the charging of the capacitor was maintained at a ground potential by the conduction of transistor T20, then again goes to the same negative potential which was present before the input signal on line 100 appeared. This negative going change of voltage on output line 120 appears at a time after the positive going input on line 100 which depends upon the setting of knob 416B and the signal introduced on line 130.

The several components of the circuit of FIG. 4 may desirably be of the following types and values for operation as above described:

| Resistors | Ohms | Transistors | Type |
|---|---|---|---|
| R1 | 56,000 | T10 | 2N404 |
| R2 | 3,900 | T20 | 2N404 |
| R3 | 2,700 | T30 | 2N697 |
| R4 | 1,000 | | |
| R5 | 47,000 | Potential source | Voltage |
| R6 | 12,000 | e1 | +6 |
| R7 | 12,000 | e2 | −20 |

Potentiometer 616, 5,000 ohms.

What is claimed is:

1. In a process control system having a control loop responsive to deviations of a first variable of a process from a desired value for controlling said first variable the combination of means for independently determining the deviation of a value of a second variable of said process from its desired value, said second variable being related to said first variable, and means outside said control loop operable in response to deviations of said second variable for varying the response of said control loop to said deviations of said first variable to provide control action for said process with a decreased response to only those of said deviations of said first variable in a sense such that control action would not tend to decrease said deviations of said second variable.

2. A combination as set forth in claim 1 in which said first variable is the Area Requirement of a particular power distribution network and said second variable is a function of the power required to return certain conditions of the network to preset desired values.

3. A combination as set forth in claim 2 in which said second variable is a weighted sum of the integrals of the component variables which make up said Area Requirement, said integrals being obtained by network measurements independent of those used to establish said first variable.

4. A combination as set forth in claim 1 in which said means outside said control loop is responsive to vary the response of said loop only during the period when the deviation of said first variable exceeds a predetermined value.

5. A combination as set forth in claim 1 in which said means outside the loop is operable to vary the response of said loop only during the period after said first variable has deviated from its desired value for a predetermined time period.

6. A combination as set forth in claim 1 in which said means outside the loop is operable to vary the response of said loop only during the period when said first variable has deviated from its desired value by more than a predetermined value for a time period exceeding a predetermined set period.

7. A combination as set forth in claim 1 in which said means operable in response to the deviations of said second variable comprises a timing device for determining when the deviation of said first variable has existed continuously for more than a set period, and means for changing the setting for said period by modifying an input to said timing device in accordance with the deviation of said second variable.

8. A combination as set forth in claim 7 in which said means for changing the setting for said period is also responsive to said deviation of said first variable.

9. In a process control system forming a control loop with a process so that the control of said process is responsive to the deviation of a first variable from its desired value to modify the process to tend to return said first variable to its desired value, the combination of means outside said loop responsive to the deviation of said first variable beyond a particular limit established for a characteristic of said first variable for changing the response of said control system to said deviation of said first variable, means operable to effectively modify said limit in accordance with the integral of said deviation of said first variable, and means for modifying said integral in accordance with independent measurements of variables of said process which are the components of said first variable so as to correct said integral, said independent measurements providing a more accurate integral value than the integrated value of said deviation of said first variables.

10. A combination as set forth in claim 9 in which said means for modifying said integral is so constructed that it is operable in accordance with readings visually made of said independent measurements.

11. In a process control system having a control loop responsive to deviations of a first variable of a process from a desired value for controlling said first variable the combination of means for independently determining the deviation of a value of a second variable of said process, said second variable being related to said first variable, means outside said control loop operable in response to deviations of said second variable from its desired value for varying the response of said control loop to said deviations of said first variable to provide control action with a decreased response to only those of said deviations of said first variable which are in a sense corresponding to a sense of deviation of said second variable which is the result of previous deviations of said first variable of opposite sense.

12. In a process control system responsive to deviations of a measured variable from a desired value to effect a control of said process so as to tend to reduce the said deviations, the combination of means outside of the control loop of said control system for establishing a limit value for a particular characteristic of said deviations of said measured variable in accordance with the value of a related independently determined variable, and means operable when said particular characteristic of said deviations of said measured variable exceed said limit value to vary the response of said loop of said control system so as to increase the tendency of said control system to reduce said deviations.

13. A combination as set forth in claim 12 in which said particular characteristic is the duration of said deviations.

14. A combination as set forth in claim 12 in which said particular characteristic is a predetermined magnitude of said deviations.

15. A combination as set forth in claim 12 in which said particular characteristic is a joint function of a predetermined magnitude of said deviations and a duration of said deviations.

16. A combination as set forth in claim 12 in which said related variable is the integral of said deviations, said integral being used for modifying the said limit value of said particular characteristic, and in which said means outside the control loop includes means for resetting the value of said integral in accordance with an independent measure of the deviation of said related variable, whereby the said related variable tends to be corrected by the action of said control loop.

17. A combination as set forth in claim 16 in which said measured variable is Area Requirement in a load-frequency control system and said related variable is the unscheduled interchange over the tie-lines with areas other than that under the control of said control system.

18. A combination as set forth in claim 17 in which said related variable is a joint function of both said unscheduled interchange and the time error of the power distribution system under control.

19. A process control system comprising a process control loop responsive to deviations of a first variable from a desired value and operable to control said process so as to tend to reduce said deviations, means responsive to deviations of a second variable from its desired value, said second variable being independently measured and having a predetermined functional relationship to said first variable, and means for varying the response of said process control loop so as to make said control loop less responsive to deviations of said first variable of sense tending to correct deviations of said second variable than the response of said control loop to deviations of said first variable of an opposite sense.

20. A combination as set forth in claim 19 in which said process control system is a load-frequency control system and said second variable is the time-error of the system under control.

21. A combination as set forth in claim 19 in which said process control system is a load-frequency control system and said second variable is a joint function of the unscheduled interchange between the network under control of said control system and other networks as well as the time-error of the interconnected networks.

22. A combination as set forth in claim 19 in which said process control system is a load-frequency control system and said second variable is the unscheduled interchange between the network under control of said control system and other interconnected networks.

23. A load frequency control system comprising control means responsive to the Area Requirement signal of a network interconnected with other networks and operable to modify the generation in the said network in response to said Area Requirement signal to tend to reduce the magnitude of said Area Requirement signal, filter means responsive to said Area Requirement signal, said filter means including means for setting limit values for a particular characteristic of said Area Requirement signal and responsive to deviations of that characteristic of said Area Requirement signal beyond said limit values to increase the response of said control system to said Area Requirement signal, and means for modifying the effective value of said particular characteristic of said Area Requirement signal with respect to said limit values in accordance with the deviations of the interchange on tie lines to said other networks from a set value and the deviations of the time-error in said network, said modification being in a sense to increase the effective difference between said signal and the limit associated with that sense of deviation of said signal which tends to reduce said interchange deviation and time-error.

24. In a process control system for responding to deviations of a measured variable from a desired value in manner to tend to reduce said deviations, the combination of
- means for establishing limit values for said measured variable,
- means for varying said limit values in accordance with the deviation of a related independently measured variable from its desired value, said limit values being varied in sense to increase the limit value for deviations of said measured variable in a sense opposite the sense of said measured variable deviations which would tend to cause the existing deviation of said related variable, and
- means operable when said measured variable exceeds said limit values to tend to control said system so that said system simultaneously minimizes the deviations of said measured variable and said related variable with a minimum of control action in said system.

References Cited

UNITED STATES PATENTS

| | | | |
|---|---|---|---|
| 3,114,037 | 12/1963 | Brownlee | 235—151.21 X |
| 3,229,110 | 1/1966 | Kleinbach et al. | 235—151.21 X |
| 3,270,209 | 8/1966 | Cohn | 235—151.21 X |
| 3,347,960 | 10/1967 | Fenley. | |

MALCOLM A. MORRISON, *Primary Examiner.*

J. F. RUGGIERO, *Assistant Examiner.*

U.S. Cl. X.R.

235—151.21; 318—18